United States Patent [19]
Feuling

[11] Patent Number: 5,893,348
[45] Date of Patent: *Apr. 13, 1999

[54] COMBUSTION CHAMBER SYSTEM HAVING AN IMPROVED VALVE ARRANGEMENT

[76] Inventor: James J. Feuling, 2521 Palma, Ventura, Calif. 93003

[*] Notice: This patent is subject to a terminal disclaimer.

[21] Appl. No.: 08/827,722

[22] Filed: Apr. 8, 1997

Related U.S. Application Data

[63] Continuation-in-part of application No. 08/592,760, Jan. 26, 1996, Pat. No. 5,638,787, which is a continuation-in-part of application No. 08/246,788, May 19, 1994, Pat. No. 5,501,191, which is a continuation-in-part of application No. 07/995,785, Dec. 23, 1992, Pat. No. 5,313,921.

[51] Int. Cl.$^6$ .................................................. F02P 15/02
[52] U.S. Cl. .................................................. 123/310
[58] Field of Search ............................. 123/310, 256, 123/279, 661

[56] References Cited

U.S. PATENT DOCUMENTS

| | | | |
|---|---|---|---|
| 2,111,601 | 3/1938 | Rabezzana et al. | 123/310 |
| 2,338,959 | 1/1944 | Nallinger et al. | 123/299 |
| 2,481,890 | 9/1949 | Toews | 123/310 |
| 3,466,321 | 4/1949 | MacKenzie | 1233/663 |
| 4,116,179 | 9/1978 | Nagumo et al. | 123/310 |
| 4,116,180 | 9/1978 | Hayashi et al. | 123/310 |
| 4,421,081 | 12/1983 | Nakamura et al. | 123/310 |
| 4,452,198 | 6/1984 | Berland | 123/310 |
| 4,742,804 | 5/1988 | Suzuki et al. | 123/256 |
| 5,313,921 | 5/1994 | Feuling | 123/310 |
| 5,501,191 | 3/1996 | Feuling | 123/310 |
| 5,638,787 | 6/1997 | Feuling | 123/310 |

Primary Examiner—Willis R. Wolfe
Assistant Examiner—Hieu T. Vo
Attorney, Agent, or Firm—Frank D. Gilliam

[57] ABSTRACT

An intake and exhaust system for use with internal combustion engines that uses two intake valves and one exhaust valve for each engine cylinder. The three valves are preferably circular and spaced around the cylinder centerline in said cylinder head. One or more spark plugs (or other suitable ignition devices) are provided in the head on the cylinder centerline and/or between pairs of adjacent valves. For best results, the two intake valves have substantially equal diameters. Preferably, the ratio of exhaust valve diameter to intake valve diameter is from about 0.95:1 to 1:1.2. The head typically has three substantially hemispheric depressions each housing one of said valves. Squish areas are preferably provided around said combustion chamber periphery. The piston surface may be at least partially planar and may have an angled or radiused periphery or may have a central recess corresponding generally to the valve region. This invention provides a fast and uniform lean burn, permits use of a high compression ratio and lower octane unleaded gasoline and provides improved thermal efficiency. Other fuels and other fuel ignition systems also benefit, such as diesel engines.

26 Claims, 4 Drawing Sheets

COMBUSTION CHAMBER SYSTEM HAVING AN IMPROVED VALVE ARRANGEMENT

This application is a continuation-in-part of application Ser. No. 08/592,760, filed Jan. 26, 1996, now U.S. Pat. No. 5,638,787 which is a continuation-in-part of application Ser. No. 08/246,788, filed May 19, 1994, now U.S. Pat. No. 5,501,191 which is a continuation-in-part of application Ser. No. 07/995,785, filed Dec. 23, 1992, now U.S. Pat. No. 5,313,921.

BACKGROUND OF THE INVENTION

This invention relates in general to improvements in internal combustion engines and, more specifically, to an improved cylinder head and piston arrangement with an improved valve and spark plug layout for use in those engines.

A great many different intake and exhaust valve arrangements have been developed over the years for use in internal combustion engines, in particular for use in automobiles. Most such engines use one intake valve and one exhaust valve at each cylinder with a single spark plug. The prior art arrangements utilize exhaust area/intake area in the range of over 65%. A great deal of effort has gone into optimizing the sizing and placement of the valves, the shape of the combustion chamber and the like. Since there is a great need for improvements in automobile fuel efficiency while maintaining or improving performance, a wide variety of different valve and spark plug configurations and arrangements have been designed and tested. In some of these, multiple valves and spark plugs have been used.

An arrangement of four valves per cylinder, two intake valves and two exhaust valves, has been disclosed, for example, by Akana in U.S. Pat. No. 3,411,490. Today, a number of high performance automobiles use four valve systems, with one or more spark plugs.

In these high performance automobiles, several spark plugs may be provided around the periphery of the combustion chamber with an additional spark plug centrally located. Manufacture and operation of these four valve, multiple spark plug engines is complex and expensive and requires complex computer control for efficient operation.

Weslake in U.S. Pat. No. 2,652,039 describes a complex cylinder head arrangement for an internal combustion engine having a wedge-shaped combustion chamber adjacent to the cylinder feeding into a cylinder chamber above the piston. The combustion chamber has an intake valve, an exhaust valve and a single spark plug. A second intake valve is provided in the cylinder chamber. A weak mixture of air and fuel enters the combustion chamber, combustion begins and a rich mixture enters through the cylinder chamber and adds to the original combusting mixture. This very complex system appears to have been unsuccessful and to never have been brought into production.

Another three valve system is described by Von Segern et al in U.S. Pat. No. 3,443,552. Here, a basically conventional cylinder head having a single intake valve and a single exhaust valve with a primary, conventional, combustion chamber is provided. In addition, a centrally located auxiliary chamber is located on the cylinder axis away from the cylinder in gas flow communication with the primary combustion chamber. The auxiliary chamber has a single intake valve and a spark plug. Combustion begins in the auxiliary chamber, spreads to the main combustion chamber where added fuel mixture is introduced. Again, this is a complex and cumbersome system that appears to have been found to be impractical.

Suzuki et al. in U.S. Pat. No. 4,742,804 discloses a number of combustion chamber configurations, including some having two intake valves and a single exhaust valve. However, this arrangement requires that the exhaust valve be considerably larger than each intake valve and provides for a localized deep recess in the piston head to receive the spark plug. The combustion chamber is in the piston, rather than in a space between a generally planar piston face and the head.

Thus, while a great number of different arrangements of multiple valves and/or multiple spark plugs have been designed, none have provided an optimum combination of structural simplicity, maximum fuel efficiency and highest performance. Despite the crowded nature of the automobile engine fuel and air introduction and exhaust removal art, there remains a continuing need for improvements providing greater overall efficiency at lowest cost.

It is, therefore, an object of this invention is to provide a simple, easily manufactured internal combustion engine combustion chamber system having increased operating efficiency. Another object is to provide such as system that provides both increased fuel efficiency and higher performance. A further object is to provide such a system with high thermal efficiency. Yet another object is to provide a system capable of operating at high compression ratios with a variety of different fuels.

SUMMARY OF THE INVENTION

The above-noted objects, and others, are accomplished, basically, by a three valve combustion chamber system for use with internal combustion engine containing a piston and a cylinder head forming a combustion chamber therebetween. The system comprises three valves in the cylinder head, spaced around the cylinder axis, two of the valves adapted to act as intake valves and the third as an exhaust valve. For most effective operation, the valves are generally round and have an exhaust valve to intake valve diameter ratio in the range of 0.95:1 to 1:1.2.

The system of this invention may use any suitable ignition means. Typically with a gasoline or natural gas powered vehicle spark plugs may be used. In a diesel engine, a glow plug or injection type igniter are typically used. One or more ignition means may be provide at each cylinder, at any suitable locations.

In a first version, three peripheral ignition means are substantially centrally located in the areas surrounded by adjacent valves and the edge of the combustion chamber. A central, fourth, ignition means may be located substantially on the cylinder axis, surrounded by the three valves. A second version has a single central ignition means located substantially on the cylinder axis, surrounded by the three valves. Other suitable positions of one or more ignition means may be used.

The cylinder head surface forming one side of the combustion chamber may have hemispheric depressions containing each of the valves, with the piston having approximately areas corresponding to matching areas on the cylinder head located around the edge of the combustion chamber and extending inwardly somewhat between adjacent valves. These opposed matching areas are configured so that as the piston and head areas closely approach each other during engine operation a very efficient "squish" area is created. This arrangement substantially improves combustion and fuel efficiency.

In order to obtain this squish effect, the matching areas may be flat, may be radiused or angled. The piston surface making up one wall of the combustion chamber may be curved or flat, or any combination thereof. The piston face may typically be entirely flat or may have a shallow central recess (typically having a depth of from about 0.1 to 1 in.) corresponding generally to the pattern of valves in the head. For example, the piston face may have a generally planar domed central area and an angled edge portion extending from the dome to the piston face edge, matching a similarly configured opposite area on the head. Alternatively, the edge portion may be radiused between a domed central flat area and the piston edge, with the edge portion of the head corresponding thereto.

In preferred embodiments, the three valves may be substantially equally spaced or may be located towards one side of the combustion chamber with the space between each intake valve and the exhaust valve being less than the distance between the two intake valves. The single central spark plug (or other ignition device) may be positioned approximately on the cylinder axis. Basically, a single combustion chamber is formed. If desired, the piston surface can be formed with one recess, and the one or more ignition means can extend into that recess.

In another preferred embodiment, two equally spaced intake valves are positioned to one side of the combustion chamber, with a single exhaust valve to the other side and two spark plugs, each positioned outwardly of a line between the center of the exhaust valve and the center of an intake valve. The intake valves and spark plugs may be symmetrically located on the sides of a line drawn through the center of the exhaust valve and equally spaced between the intake valves. Squish areas may be located along the edges of the combustion chamber and between each adjacent pair of valves.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
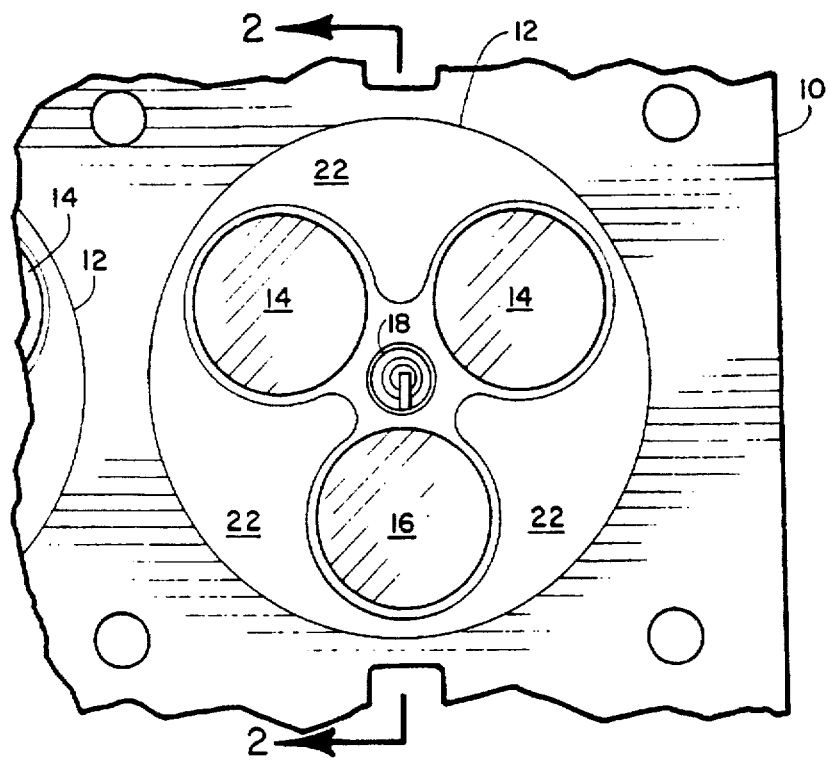
FIG. 1 is a plan view of the face of a cylinder head combustion chamber, showing a first embodiment of this invention.
Figure 2:
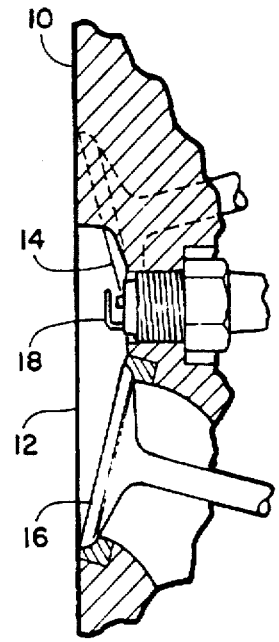
FIG. 2 is a section view, taken substantially on line 2—2 in FIG. 1.

Referring to FIGS. 1 and 2, there is seen a cylinder head 10 having a recessed combustion chamber 12. Head 10 has a number of conventional bolt holes, vents and the like 11 for attachment of the head to the engine block (not shown) and other purposes. Two intake valves 14 open to allow entry of air or an air-fuel mixture into combustion chamber and close during combustion. One exhaust valve 16 is closed during combustion and opens to allow egress of exhaust gases. Optimally, the faces of valves 14 and 16 are circular and the three valves are substantially uniformly arranged around the cylinder and combustion chamber axis or the two intake valves 14 are evenly spaced from exhaust valve 16 but at a different distance from each other. The shafts may be canted to the cylinder centerline or vertical (parallel to the cylinder centerline), as desired.

The faces of intake valves 14 preferably have the same area so that identical open areas are provided when the valves open and gas flow therethrough is uniform in pattern and volume for optimum efficiency. However, if desired, the two intake valves could have different areas, typically varying up to about 50% in area. Preferably, the valves have an exhaust valve to intake valve diameter ratio in the range of 0.95:1 to 1:1.2.

The utilization of the small exhaust port cross-sectional area and valves provides high exhaust gas velocity, on the order of 450 to 500 ft/sec. Intake gas velocity, depending on the type of fuel and/or the presence of fuel in the intake throat would be in the 225 to 300 ft/sec range. This configuration yields excellent operating characteristics, such as throttle response, exhaust gas scavenging, charge purity and volumetric efficiency. Smaller exhaust ports allow for significantly reduced heat transfer.

Figure 10:
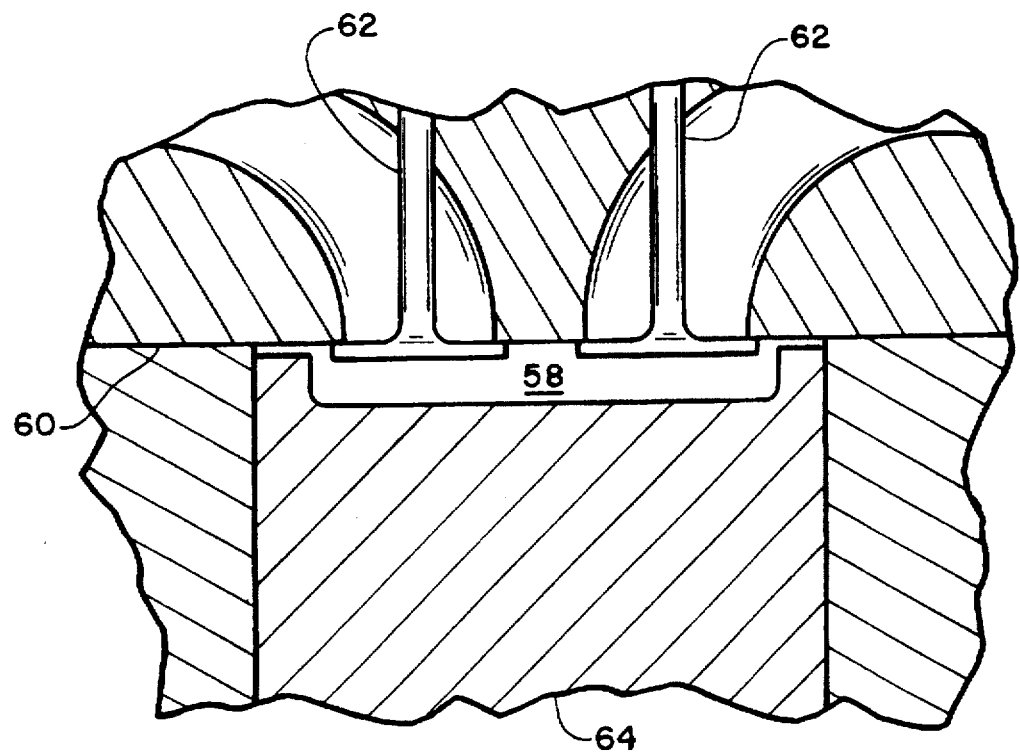
FIG. 10 is a generally axial section through a combustion chamber enclosed by a substantially flat head and a recessed piston.

In the embodiment of FIG. 1, one central spark plug 18 is used. While spark plugs will be referred to in this description of preferred embodiments, it should be remembered that any other suitable ignition means for fuel/air mixtures may be used as desired. A central spark plug 18 is shown located substantially on the cylinder centerline and may extend above the surface of the combustion chamber 12, in the preferred arrangement, as shown or may be recessed slightly below the surface, if desired. If desired, the tip of spark lug 18 could extend below the surface of head 10, into a single cavity 58 in piston 64 as seen in FIG. 10.

Figure 3:
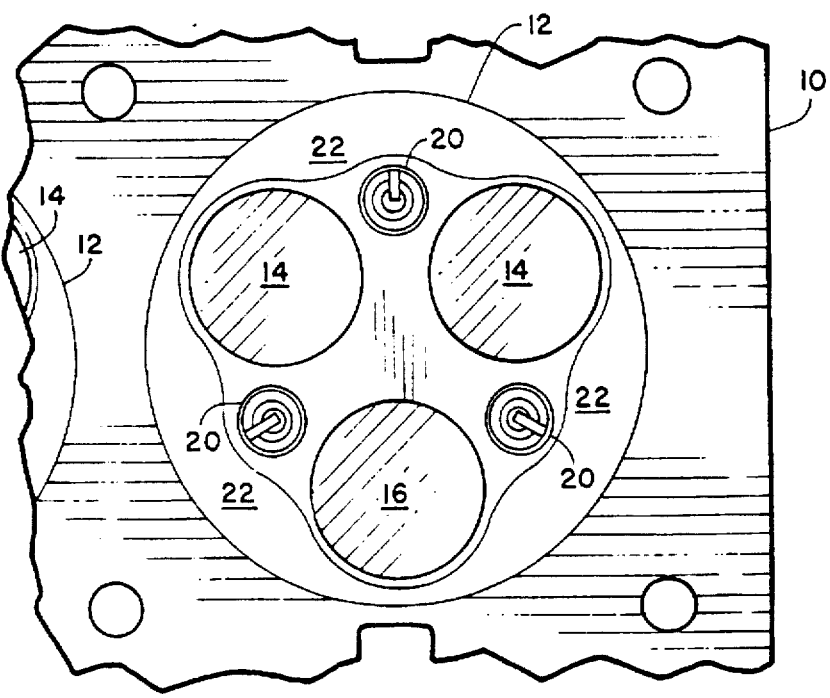
FIG. 3 is a plan view similar to FIG. 1 but showing a second embodiment of the invention.

In the alternative embodiment shown in FIG. 3, three peripheral spark plugs 20 are used. While optimum efficiency may in some instances be improved by the addition of a fourth spark plug centrally located in the FIG. 3 embodiment, the embodiment of FIG. 3 is less costly and in many cases provides more or at least sufficient efficiency. If a recessed piston having a single large recess forming approximately half of a single combustion chamber as seen in FIG. 10 is used, tips of all of the ignition means 20 could extend slightly in that recess.

Figure 4:
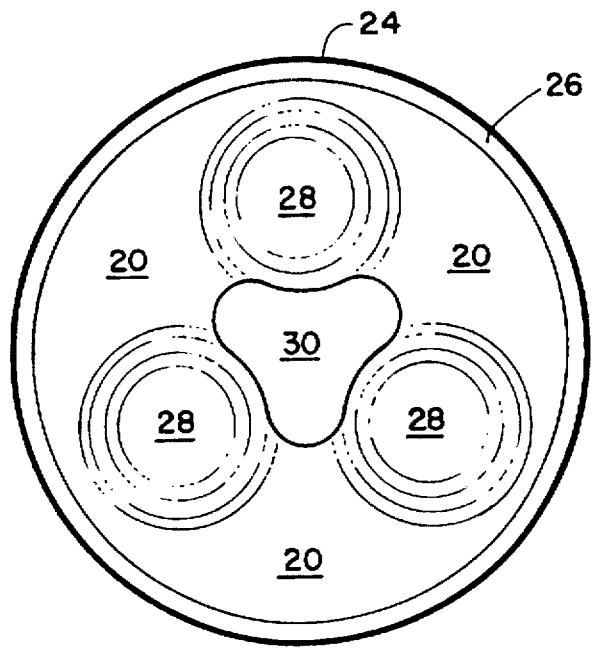
FIG. 4 is a plan view of a piston face configuration useful with this invention.

FIG. 4 shows the face of a piston 24 optimized for use with the combustion chamber 12 arrangement shown in FIGS. 1–3. For optimum combustion a "squish" area is often desired between portions of the opposed faces of piston 24 and combustion chamber 12. In that case, the areas 22 (as seen in FIGS. 1 and 3) are flat and slightly tapered away from piston 24 toward the combustion chamber centerline and the corresponding areas 26 are similarly flat and slightly tapered so that those areas closely approach each other as piston 24 makes its closest approach to combustion chamber 12 during engine operation, squeezing the fuel/air mixture in those areas toward the center of combustion chamber 12. Areas 26 may extend inwardly from edge to at least partially match areas 22 between adjacent valves. Areas 22 and 26 lie approximately perpendicular to the centerline of the combustion chamber and cylinder. This "squish" effect has been found to improve combustion efficiency. Recessed areas 28 are formed in the face of piston 24 around central pad 30 to provide the desired compression ratio in conjunction with the squish areas. Recessed areas 28 are sized to provide the desired compression ratio in conjunction with the squish areas.

Figure 5:
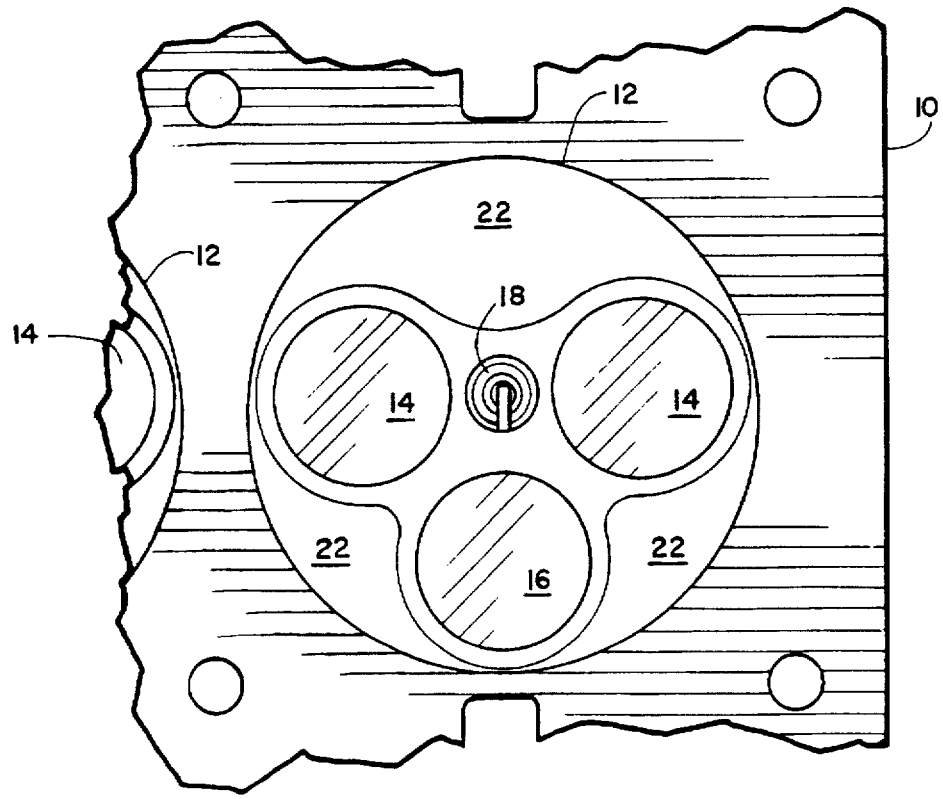
FIG. 5 is a plan view similar to FIG. 1 but showing a third embodiment of the invention.

FIG. 5 shows a plan view of another embodiment of the combustion chamber system. Here, the combustion chamber 12 in cylinder head 10 has a generally similar configuration to that shown in FIG. 1, but with a different valve arrangement. Intake valves 14 are positioned closer to exhaust valve 16 than to each other. The size relationship among the valves is the same as described above. Squish plates 22 of the sort described above are provided between adjacent valves, with the squish plate between the two intake valves 14 being larger in area than that between each intake valve 14 and the exhaust valve 16. The cooperating piston face may have squish The embodiment shown in FIG. 5 is particularly useful in permitting an offset pushrod arrangement for operating the valves. If desired, three spark plugs 18 could be used, spaced around the periphery between each adjacent pair of valves, as shown in FIG. 3. Or, three spark plugs oriented as shown in FIG. 3 plus a centrally located plug as seen in FIG. 1 could be used together.

Figure 6:
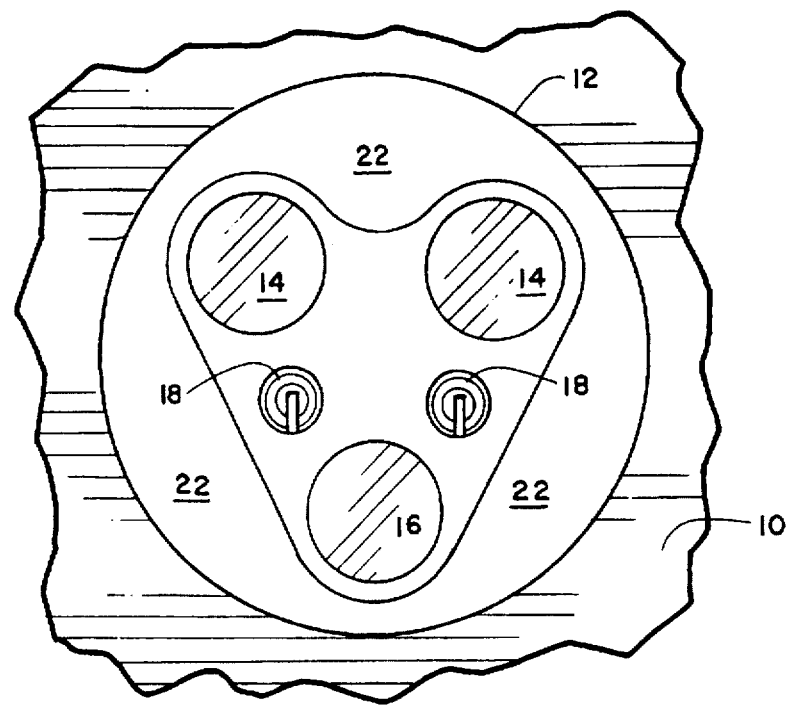
FIG. 6 is a plan view similar to FIG. 1 but showing a fourth embodiment of the invention.

FIG. 6 shows a plan view of another embodiment of the combustion chamber system. Here, the combustion chamber 12 in cylinder head 10 has a generally similar configuration to that shown in FIG. 1, but with a different valve arrangement. Two intake valves 14 are positioned to one side of chamber 12, with exhaust valve 16 to the other side. Two spark plus 18 are located between exhaust valve 16 and each intake valve 14. Each spark plug 18 is positioned outwardly of a line drawn between the center of exhaust valve 16 and each intake valve 14. A line of symmetry can be drawn from the center of exhaust valve between and equally spaced from intake valves 14. The combustion on one side of that line of symmetry is a mirror image of the other side. For optimum operation, squish areas 22 are provided between each adjacent pair of valves, with the edge of the squish areas between exhaust valve 16 and each intake valve 14 being a substantially straight line drawn approximately parallel to a line drawn through the centers of the exhaust valve 16 and an intake valve 14. While the arrangement shown with two spark plugs in FIG. 6 is preferred, if desired three peripheral plugs as shown in FIG. 3 and/or a central plug as shown in FIG. 1 could be used.

Figure 7:
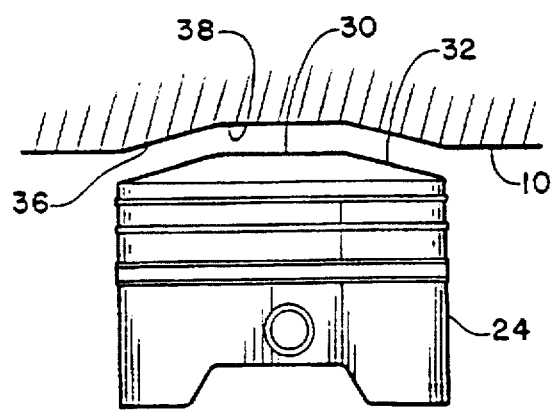
FIG. 7 is a schematic elevation view of a piston having a domed face and angled edge, with a corresponding head shape.

FIG. 7 shows in schematic elevation another embodiment in which piston 24 has a flat center face portion 30 lying substantially perpendicular to the piston centerline and an angled edge portion 32. As schematically indicated by line 34, the head 10 will include a matching angled portion 36 to form a squish area with piston angled area 32. The central area 38 in head 10 will contain the valves and ignition means of the sort shown in FIG. 1 or others.

Figure 8:
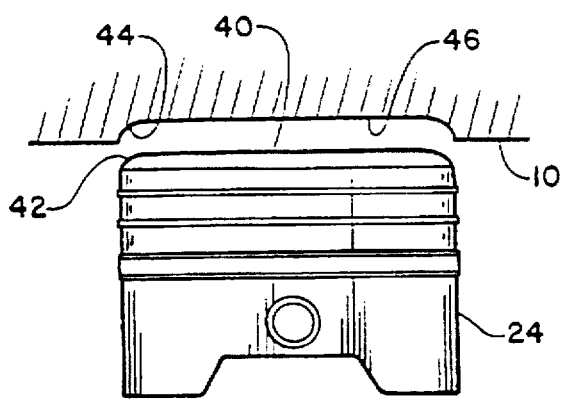
FIG. 8 is a schematic elevation view of a piston having a domed face and radiused edge, with a corresponding head shape.

A further embodiment of the piston face configuration is schematically illustrated in FIG. 8. Here piston 24 has a flat center face portion 40 generally perpendicular to the piston axis. The edge of the face of piston 28 has a radiused edge area 42. Head 10 schematically shows a radiused edge portion 44 complementary with piston edge portion 42 to provide a radiused squish area and a central area 46 wherein the valves and ignition means of the sort shown in FIG. 1 et seq. could be located.

Figure 9:
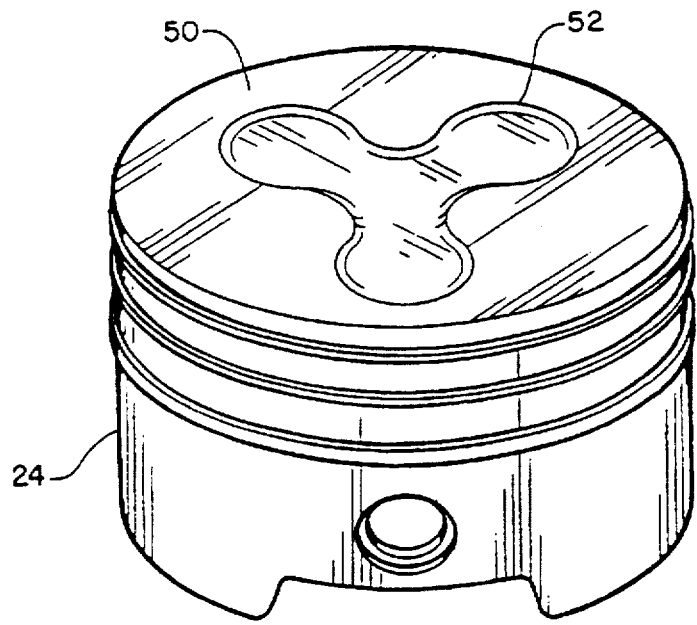
FIG. 9 is a perspective view of a piston face with a shallow central recess configured to generally match the head valve configuration.

FIG. 9 illustrates an embodiment in which piston 24 has an approximately flat edge portion 50 and a shallow recessed central portion 52. Edge portion 50 cooperates with a similar area in a head (not shown) of the sort shown in FIG. 1 to provide a squish action. Preferably, the two edge portions are arranged with a closer spacing at the piston edge opening slightly toward the center to "squish" the charge toward the center and ignition means. The size and shape of recessed area 52 corresponds to the general outer shape of the head squish pads, such as squish area 22 in FIG. 1. While recess 52 can have any suitable depth, with most pistons a depth of from about 0.1 to 1 inch is preferred.

With the deeper piston recesses 58, the cylinder head 60 may be only slightly recessed around the valves 62 or may be flat as shown in schematic approximately axial section view in FIG. 10. The valves may be coplanar with the flat cylinder head or extend slightly into the cavities 58 in piston 64, as desired.

while certain preferred materials, dimensions and arrangements have been described in detail in conjunction with the above description of preferred embodiments, those can be varied, where suitable, with similar results. For example, in the embodiment shown in FIG. 6, a single spark plug could be used at the center of the cylinder (as shown in FIG. 5) instead of the two spark plugs shown. Other applications, variations and ramifications of this invention will occur to those skilled in the art upon reading this disclosure. Those are intended to be included within the scope of this invention, as defined in the appended claims.

I claim:

1. An improved combustion chamber system for use with internal combustion engine having at least one piston and a cooperating cylinder head forming a combustion chamber therebetween, which comprises:

three generally circular valves in said head at said combustion chamber, said valves being arranged around an axis of said cylinder;

two of said valves adapted to act as intake valves;

said third valve being adapted to act as an exhaust valve;

said exhaust and intake valves having a ratio of exhaust valve diameter to intake valve diameter being from about 0.95:1 to 1:1.2;

said piston having an at least partially planar face adjacent to said head forming one wall of said combustion chamber; and at least one ignition means for igniting an air/fuel mixture in said combustion chamber, said ignition means located entirely within said head without extending below said partially planar face at any point during engine operation.

2. The system according to claim 1 wherein said ignition means comprises a single spark plug located in said head approximately at a cylinder axis.

3. The system according to claim 1 wherein said head includes three hemispheric depressions each housing one of said valves.

4. The system according to claim 1 wherein said ignition means comprises three ignition means each approximately centrally located in one of three spaces bounded by two adjacent valves and a cylinder edge.

5. The system according to claim 4 further including a fourth spark plug located in said head substantially on an axis of said cylinder.

6. The system according to claim 1 wherein said piston face has a substantially planar raised central area surrounded by a radiused periphery and a squish area is provided along a combustion chamber periphery.

7. The system according to claim 1 wherein said piston has a substantially planar periphery and a recessed central area opposite said valves and a squish area is provided along a combustion chamber periphery.

8. The system according to claim 7 wherein said head is flat across said combustion chamber.

9. An improved combustion chamber system for use with internal combustion engine having at least one piston and a cooperating cylinder head forming a combustion chamber therebetween, which comprises:

three valves in said head at said combustion chamber, said valves being arranged around an axis of said cylinder;

two of said valves adapted to act as intake valves;

said third valve being adapted to act as an exhaust valve;

said exhaust and intake valves having a ratio of exhaust valve diameter to intake valve diameter being from about 0.95:1 to 1:1.2;

said piston having a face adjacent to said head forming one wall of said combustion chamber; and at least one ignition means for igniting an air/fuel mixture in said combustion chamber, said ignition means located entirely within said head without extending below said partially planar face at any point during engine operation.

10. The system according to claim 9 wherein said ignition means comprises a single spark plug located in said head approximately at a cylinder axis.

11. The system according to claim 9 wherein said head includes three hemispheric depressions each housing one of said valves.

12. The system according to claim 9 wherein said ignition means comprises three ignition means each approximately centrally located in one of three spaces bounded by two adjacent valves and a cylinder edge.

13. The system according to claim 12 further including a fourth spark plug located in said head substantially on an axis of said cylinder.

14. An improved combustion chamber system for use with internal combustion engine having at least one piston and a cooperating cylinder head forming a single combustion chamber therebetween, which comprises;

three valves in said head at said single combustion chamber, said valves being arranged around an axis of said cylinder;

two of said valves adapted to act as intake valves;

said third valve being adapted to act as an exhaust valve;

said exhaust and intake valves having a ratio of exhaust valve diameter to intake valve diameter being from about 0.95:1 to 1:1.2;

said piston having an at least partially planar face adjacent to said head forming one wall of said combustion chamber; and at least one ignition means for igniting an air/fuel mixture in said combustion chamber.

15. The system according to claim 14 wherein said piston face has a substantially planar raised central area surrounded by an angled periphery and an angled squish area is provided along a combustion chamber periphery.

16. The system according to claim 14 wherein said piston face has a substantially planar raised central area surrounded by a radiused periphery and a squish area is provided along a combustion chamber periphery.

17. The system according to claim 14 wherein said piston has a substantially planar periphery and a recessed central area opposite said valves and a squish area is provided along a combustion chamber periphery.

18. The system according to claim 14 wherein said ignition means comprises a single spark plug located in said head approximately at a cylinder axis.

19. The system according to claim 14 wherein said head includes three hemispheric depressions each housing one of said valves.

20. The system according to claim 14 wherein said ignition means comprises three ignition means each approximately centrally located in one of three spaces bounded by two adjacent valves and a cylinder edge.

21. The system according to claim 20 further including a fourth spark plug located in said head substantially on an axis of said cylinder.

22. An improved combustion chamber system for use with internal combustion engine having at least one piston and a cooperating cylinder head forming a combustion chamber therebetween, which comprises:

three valves in said head at said combustion chamber, said valves being arranged around an axis of said cylinder;

two of said valves adapted to act as intake valves;

said third valve being adapted to act as an exhaust valve;

said exhaust and intake valves having a ratio of exhaust valve diameter to intake valve diameter being from about 0.95:1 to 1:1.2;

said piston having a face adjacent to said head forming one wall of said combustion chamber; and at least one ignition means for igniting an air/fuel mixture in said combustion chamber.

23. The system according to claim 22 wherein said ignition means comprises a single spark plug located in said head approximately at a cylinder axis.

24. The system according to claim 22 wherein said head includes three hemispheric depressions each housing one of said valves.

25. The system according to claim 22 wherein said ignition means comprises three ignition means each approximately centrally located in one of three spaces bounded by two adjacent valves and a cylinder edge.

26. The system according to claim 25 further including a fourth spark plug located in said head substantially on an axis of said cylinder.

* * * * *